US008341592B2

(12) United States Patent
Akkiraju et al.

(10) Patent No.: US 8,341,592 B2
(45) Date of Patent: Dec. 25, 2012

(54) SYSTEM AND METHOD FOR CONDUCTING DEPENDENCY ANALYSIS OF BUSINESS COMPONENTS

(75) Inventors: RamaKalyani T. Akkiraju, Yorktown Heights, NY (US); Richard Thomas Goodwin, Dobbs Ferry, NY (US); Anca-Andreea Ivan, New Rochelle, NY (US); Juhnyoung Lee, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1161 days.

(21) Appl. No.: 12/054,827

(22) Filed: Mar. 25, 2008

(65) Prior Publication Data

US 2008/0177622 A1    Jul. 24, 2008

(51) Int. Cl.
*G06F 9/44* (2006.01)
(52) U.S. Cl. ........................................ 717/105; 717/102
(58) Field of Classification Search .................. 717/105, 717/102
See application file for complete search history.

(56) References Cited

U.S. PATENT DOCUMENTS

| | | | |
|---|---|---|---|
| 6,601,233 B1 | 7/2003 | Underwood | |
| 7,334,216 B2 * | 2/2008 | Molina-Moreno et al. ... | 717/109 |
| 7,409,671 B1 * | 8/2008 | Meredith et al. .............. | 717/104 |
| 7,503,033 B2 * | 3/2009 | Meredith et al. .............. | 717/104 |
| 7,577,934 B2 * | 8/2009 | Anonsen et al. .............. | 717/102 |
| 7,634,766 B2 * | 12/2009 | Ali et al. ...................... | 717/141 |
| 7,730,446 B2 * | 6/2010 | Anonsen et al. .............. | 717/104 |
| 7,860,902 B2 * | 12/2010 | Brendle et al. ................ | 707/809 |
| 7,895,572 B2 * | 2/2011 | Stienhans ...................... | 717/120 |
| 2001/0053991 A1 * | 12/2001 | Bonabeau ......................... | 705/7 |
| 2003/0115211 A1 * | 6/2003 | Chen et al. .................... | 707/102 |
| 2004/0015819 A1 * | 1/2004 | Romano-Critchley et al. ............................. | 717/102 |
| 2004/0073442 A1 * | 4/2004 | Heyns et al. ...................... | 705/1 |
| 2004/0098358 A1 * | 5/2004 | Roediger ......................... | 706/46 |
| 2004/0181775 A1 * | 9/2004 | Anonsen et al. .............. | 717/104 |
| 2005/0071750 A1 * | 3/2005 | Nelson .......................... | 715/503 |
| 2005/0154976 A1 * | 7/2005 | Nelson .......................... | 715/513 |
| 2006/0241956 A1 * | 10/2006 | Levy et al. ......................... | 705/1 |

OTHER PUBLICATIONS

Gordijn et al., "Comparing Two Business Model Ontologies for Designing e-Business Models and Value Constellations", Jun. 2005.*
Kozaczynski, "Architecture Framework for Business Components", 1998.*
Soley, "Model Driven Architecture", Nov. 27, 2000.*
Arch-int et al., "Development of industrial information systems on the Web using business components", 2003.*
Hemangi A. Parab, "A Case Study: Reverse Engineering a Multi-Tiered Application with Rational Unified Process, Rational Rose and UML", 2001.*

* cited by examiner

*Primary Examiner* — Phillip H Nguyen
(74) *Attorney, Agent, or Firm* — Whitham, Curtis, Christofferson & Cook, P.C.; William Stock (57) ABSTRACT

A system and method is provided for the ontological representation of the meta-models of businesses and their processes, activities, and components in one or more semantic web markup languages to enable reasoning and analyzing of instances of enterprise business models to infer relationships of business entities which are previously unknown or not clear from the original business model instance.

21 Claims, 9 Drawing Sheets

SYSTEM AND METHOD FOR CONDUCTING DEPENDENCY ANALYSIS OF BUSINESS COMPONENTS

This invention is related to commonly owned patent application Ser. No. 11/176,371 for "SYSTEM AND METHOD FOR ALIGNMENT OF AN ENTERPRISE TO A COMPONENT BUSINESS MODEL" which is incorporated by reference herein.

BACKGROUND OF THE INVENTION

1. Field of the Invention

The present invention generally relates to model-driven business analysis and transformation, and more particularly to a system and method for ontological representation of the meta-models of businesses and their processes, activities, and components so as to infer previously unknown or unclear relationships of business entities.

2. Background Description

Business component models can be used in many ways, almost all of which require an understanding of what the business wants to achieve. Component business models do not introduce any new or special meaning for "business process". The term is important but it is not used in any special way. We speak of the sub-processes within a component. We speak of an end-to-end process that provides an external service. We can and do analyze the network of collaborating components (including external components) that make up a process or a sub-process.

However, for the association of Key Performance Indicators (KPIs) with business components, business consultants applying component business models need to determine which components are associated with, and influence, a given KPI. They also need to associate KPIs with components, when it is more natural to associate KPIs with activities. Furthermore, to identify dependency among business components (by process or by KPI), consultants need to determine how components depend on each other based on the control flow defined by processes. A systematic and automated framework for linking KPIs, activities and components would better enable a deep analysis of the relationship between components.

SUMMARY OF THE INVENTION

In order to address these problems of the prior art, it is an object of the present invention to capture the relationship between KPIs in a semantic model.

Another object of the invention is to create a semantic model that associates KPIs with activities, and activities with components.

It is also an object of the invention to create a semantic model that associates processes with activities, and activities with components.

A further object of the invention is to automatically infer the dependencies between components.

The invention uses the Component Business Model (CBM) described in related patent application Ser. No. 11/176,371 for "SYSTEM AND METHOD FOR ALIGNMENT OF AN ENTERPRISE TO A COMPONENT BUSINESS MODEL" (hereafter termed "the above referenced foundation patent application"). CBM provides a logical and comprehensive view of the enterprise, in terms that cut across commercial enterprises in general and industries in particular. The component business model as described in the above referenced foundation patent application is based upon a logical partitioning of business activities into non-overlapping managing concepts, each managing concept being active at the three levels of management accountability: providing direction to the business, controlling how the business operates, and executing the operations of the business. The term "managing concept" is specially defined as described in the above referenced foundation patent application, and is not literally a "managing concept" as that phrase would be understood in the art. For the purpose of the present invention, as for the related invention, "managing concept" is the term associated with the following aspects of the partitioning methodology. First, the methodology is a partitioning methodology. The idea is to begin with a whole and partition the whole into necessarily non-overlapping parts. Second, experience has shown that the partitioning process works best when addressed to an asset of the business. The asset can be further described by attributes. Third, the managing concept must include mechanisms for doing something commercially useful with the asset. For a sensibly defined managing concept these mechanisms must cover the full range of management accountability levels (i.e. direct, control and execute). Managing concepts are further partitioned into components, which are cohesive groups of activities. The boundaries of a component usually fall within a single management accountability level. It is important to emphasize that the boundaries between managing concepts (and between components within managing concepts) are logical rather than physical.

Component Business Modeling (CBM) is a technique for modeling an enterprise as non-overlapping components in order to identify opportunities for innovation and improvement. The modeling is of the business itself, not of applications or technology. CBM is an analytical tool; some call it a lens through which they can examine and analyze a business. CBM is complementary to process modeling techniques. A business process can be interpreted in CBM as collaboration among a network of business components. Conversely, from a process perspective, a business component is a closely related group of sub-processes.

CBM models a business as a set of business components. A business component is a part of an enterprise that has the potential to operate independently, in the extreme case as a separate company, or as part of another company. A business component is a logical view of part of an enterprise that includes the resources, people, technology and know-how necessary to deliver some value.

A business offers goods or services in exchange for money or for other goods or services. So must a business component if it is to operate independently. In turn, a business component uses goods and services provided by other components and external suppliers. The single term "business service" is used to mean some goods or service that a business component offers to other business components and/or to external parties.

The key characteristic of a business component is that a user of its services doesn't have to be aware of how the component works. A user therefore doesn't need to know what people, processes and technology are being used, nor what other supplier services are contributing to the result. The user of a service only knows about the service itself, along with whatever associated properties are relevant, for example: the price, agreed service levels, terms and conditions. If a business component improves its technology, reengineers its internal processes or subcontracts some internal operations, its users need not know.

Business components are only potentially independent. They may be identified as "target" components, even when they are still entangled with the rest of the business and when the services they offer are not fully defined, as described more fully in the above referenced foundation patent application. A business component can also be characterized by associating it with a set of business activities. A business activity is simply something the enterprise does, specified at a level that the enterprise considers to be appropriate.

This definition of a business component is consistent with the standard usage of system component and software component, and in particular with the use of component in the ADS (Architecture Description Standard) and in the Component Model work product description in IBM Global Services Method. Each is characterized by encapsulation: the user of a component's services does not (need to) know about the inside of the component. The obvious difference is that a software component offers software services, whereas a business component offers business services.

There is some similarity between a strategic capability in CBM and a system quality or non-functional requirement (NFR) in system development. For example, "sub-second response on customer transactions" is a typical NFR on a system. It is a desired or necessary property of the whole system. As a result of analysis, the requirement may be restated in terms of services offered by relatively few components. These components use other components, which in turn use yet others. To meet the requirement, a large number of components may have to contribute.

Heat map analysis, as described in the above referenced foundation patent application, creates multidimensional views (strategic, financial, and transformational views) of components to identify strategic components that carry high costs or have high potential for business improvement. The practice of creating heat maps using manual labeling of values results in inconsistent and incomplete maps, and lack of scalability. Furthermore, a manual methodology limits heat maps to a relatively flat analysis, because it is difficult to go deeper or broader (drill-down, roll-up). Manually developed heat maps are limited to only a small set of KPIs (e.g., cost, revenue).

Industry maps are created from the universal enterprise map, and maps for particular enterprises are created from industry maps. What is needed is an automated method of propagating modifications of these maps up-stream and down-stream within the chain going from the universal map to industry maps to maps for particular enterprises within an industry. An automated system would allow consultants to reuse the knowledge accumulated in previous engagements.

Defining components with name and short description in maps introduces ambiguity and inconsistency, and different interpretations. Similarly, shortfall assessment by visual examination can become tedious and inaccurate, if not impossible, as the number of applications increases. For example, in a single enterprise there may be a thousand or more applications for an accounting division.

For the heat map analysis described in the above referenced foundation patent application, the present invention creates a semantic model of components and views, such that heat maps can be automatically generated by using simple semantic queries. It derives values of a component from the values of entities associated with the component, and so enables root-cause and impact analysis. It extends the analysis to a larger set of KPIs.

For providing consistency across the universal enterprise map, industry maps, and maps for particular enterprises within an industry, this invention captures the relationships among these maps. It provides a controlled vocabulary for common understanding of terms. It provides better, consistent definition of terms. It provides automatic translation of terms. It propagates (interactively) the modifications to these maps.

For the shortfall assessment, given a semantic model, gaps, duplication, and over-extension of IT systems can be discovered by semantic queries. The present invention alleviates the need for visual examination. Semantic query will not replace visual CBM; it will complement visual examination.

The present invention provides a system and method for business analysis using reasoning on semantic models.

The present invention provides a system and method for business components and their dependency visualization.

The present invention provides a system and method for semantic model as the meta-model of business components.

The present invention provides a system and method for creation of business models by using existing patterns and templates.

The present invention provides a system and method for creation of business models by using a simple mouse operation.

The present invention provides a system and method for multiple layers of business component models for the universal enterprise map, industry maps, and maps for particular enterprises within an industry.

The present invention provides a system and method for saving and reusing business maps.

The present invention provides a system and method for propagation of changes in a map across maps in multiple layers.

The present invention provides a system and method for the notion of an ontology providing a controlled vocabulary for specific domains such as industry sectors.

The present invention provides a system and method for business performance analysis: automatic reasoning enabling dependency analysis of business components based on business metrics.

The present invention provides a system and method for automatic reasoning enabling dependency analysis (impact analysis) of business components based on business processes.

The present invention provides a system and method for automatic reasoning enabling dependency analysis of business components based on messages sent and received among them.

The present invention provides a system and method for automatic generation of heatmap analysis of business components: multi-dimensional analysis using various attributes of business components.

The present invention provides a system and method for automatic generations of shortfall assessments.

The present invention provides a system and method for business reasoning system allowing both canned queries and ad hoc queries.

The present invention provides a system and method for dependency analysis based on temporal relationships of business metrics.

The present invention provides a system and method for benchmark analysis using an industry standard frameworks and taxonomies.

The present invention provides a system and method for identification of redundant and/or overlapping business components.

The present invention provides a system and method for value network analysis using semantic models.

The method of the invention analyzes dependencies of components in a component model of a business. The method begins by generating a semantic business model by applying a business meta-model to a description of the business. A component business model of the business is presented to the user, and then an analytical query of the component business model is received from the user. The query is then executed through the semantic business model to provide a response to the query, and dependencies among components of the component business model are inferred from this execution. The response and the inferred dependencies are then returned to the user.

The semantic business model is a meta-model of business components created by capturing semantics of business information and representing the semantics in a semantic markup language. The semantic markup language can be the Resource Description Framework (RDF) or the Web Ontology Language (OWL), among others. The semantic business model can be generated by reusing an existing business semantic model, the reuse being accomplished using a computer pointing device operation. The computer pointing device operation makes available to the generated business model business information associated with one or more of business processes, business activities, resources, services, metrics, and KPIs.

The semantic business model includes business model layers for the particular enterprise or business, the industry within which the particular enterprise exists, and the overall enterprise model which serves as a source of, and a repository for, maps for industries and particular enterprises. Updates to the component business model are propagated across these layers. The dependencies can be inferred in a number of ways. They can be inferred by using KPI associations represented in the semantic business model. They can also be inferred by using business process associations represented in the semantic business model. Or they can be inferred based on messages sent and received among components as represented in the semantic business model.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
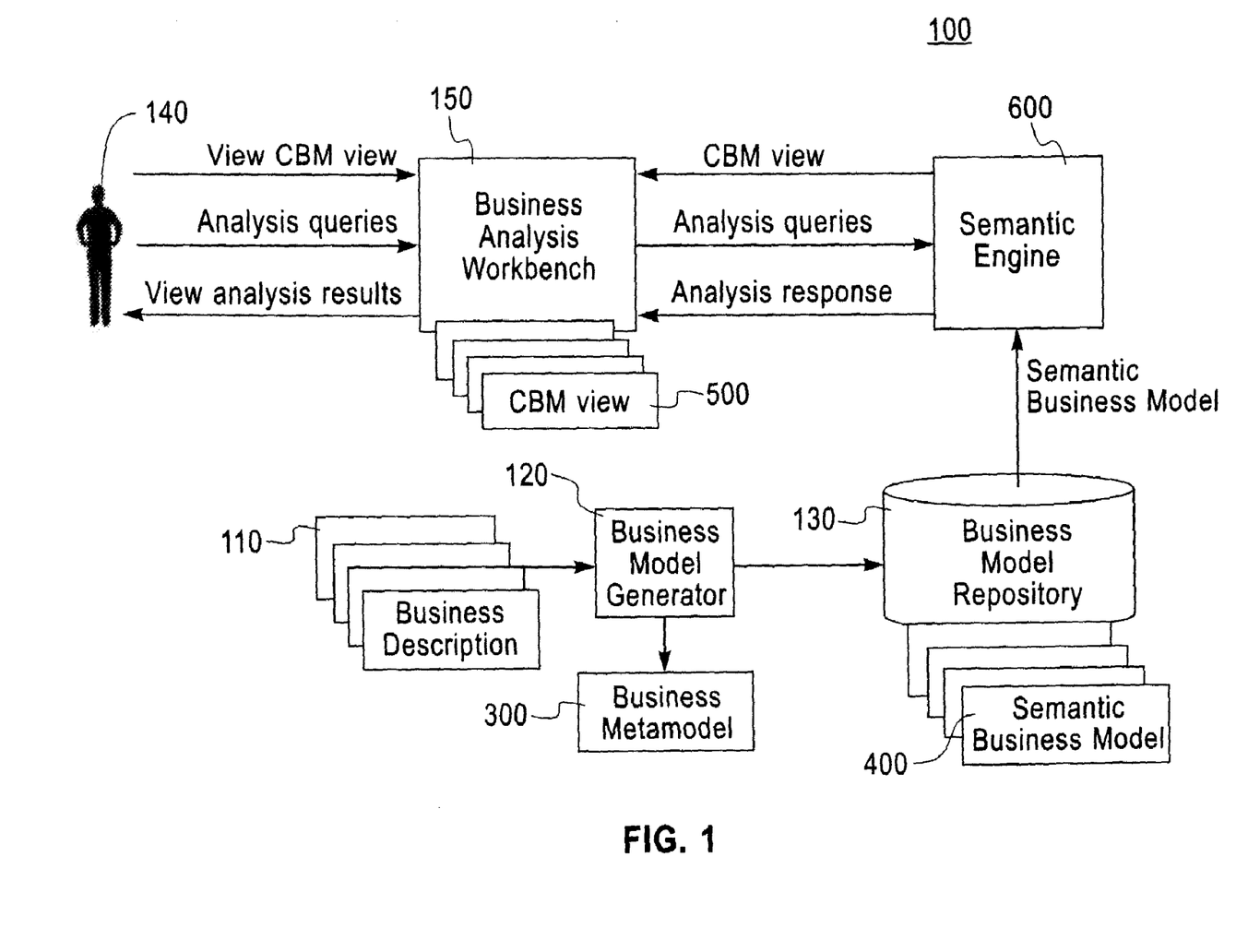
FIG. 1 is schematic showing a system architecture for the invention.

Referring now to the drawings, and more particularly to FIG. 1, there is shown a system architecture for conducting dependency analysis of business information. The system comprises semantic business models 400 which are an ontological representation of businesses and their processes, activities, and components in one or more semantic web markup languages. The semantic business models 400 enable reasoning and analyzing of instances of enterprise business models to infer relationships of business entities (e.g. key performance indicators and business components) which are previously unknown or not clear from the original business description 110.

The system also comprises a business model generator 120 which generates the ontological representation of the semantic business models 400 by interpreting descriptions of business 110 from various sources in various forms based on the formalism described in the business meta-model 300 representing structure and semantics of business information comprising one or more business entities including, but not limited to, business components, processes, activities, resources, services, metrics, and KPIs (Key Performance Indicators).

Once a semantic business model 400 has been generated, the business model generator 120 stores the model to the business model repository 130. The business model repository 130 is a database of semantic business models 400. It categorizes the models and stores them in a persistent storage medium for use by the semantic engine 600 and business analysis workbench 150.

The semantic engine 600 processes one or more semantic business models 400 retrieved from the business model repository 130 for rendering in the business analysis workbench 150, and also answers queries for inferring dependencies among one or more business components represented in one or more semantic business models.

The business analysis workbench 150 uses respective component business model (CBM) views to render one or more semantic business model 400 views on one or more computer screens. It also accepts one or more analysis queries from one or more users (i.e. business analysts 140), and also renders one or more query results in one or more business model visualizations to one or more users 140.

The process of the system of the present invention consists of two parts: the build-time process where one or more semantic business models 400 are created by using the business model generator 120, and the run-time process where one or more business analysts 140 use the created semantic business models 400 for business analysis through a business analysis workbench 150.

Figure 2A:
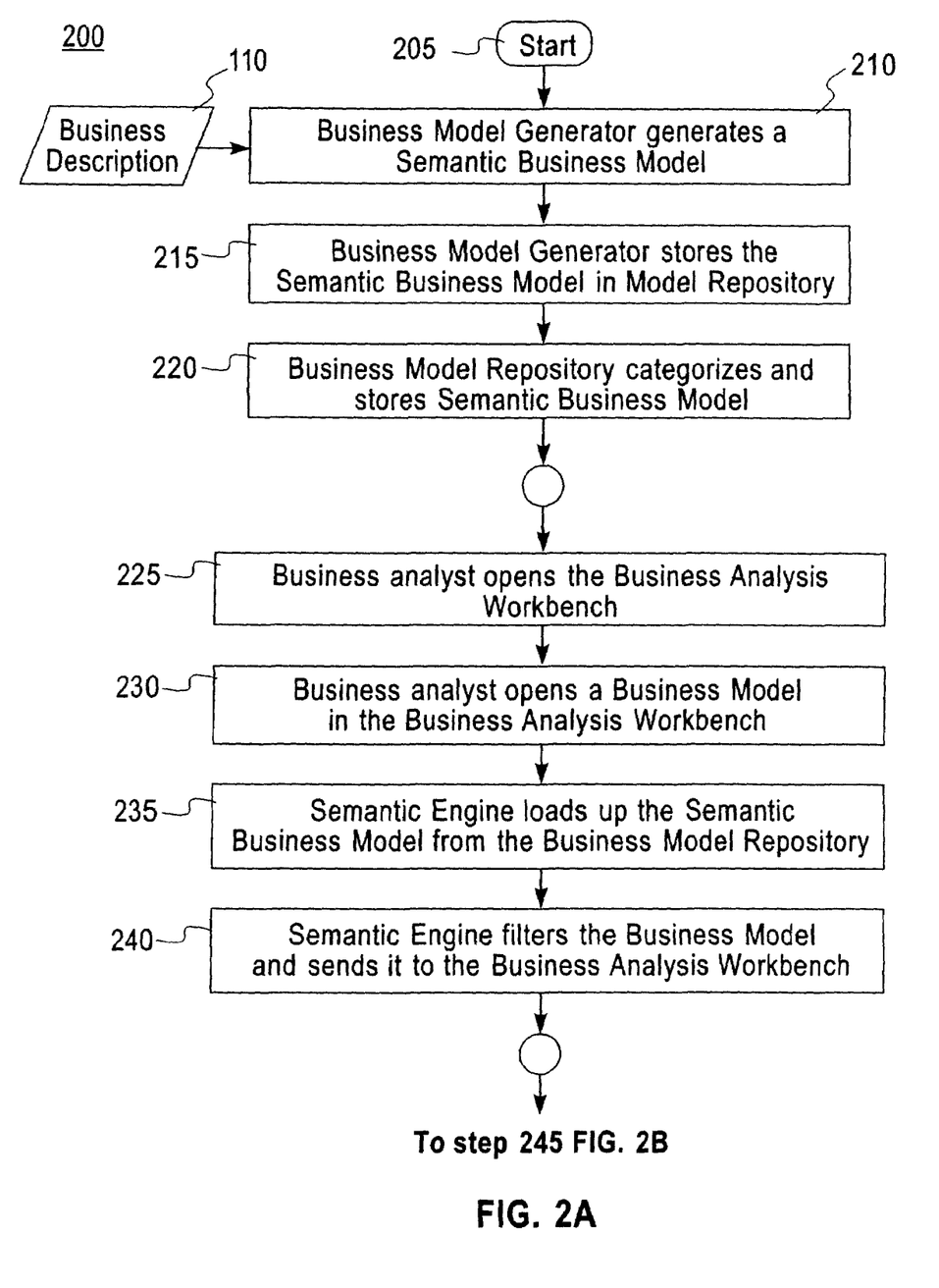
FIG. 2 is a flowchart showing operation of the invention.
Figure 2B:
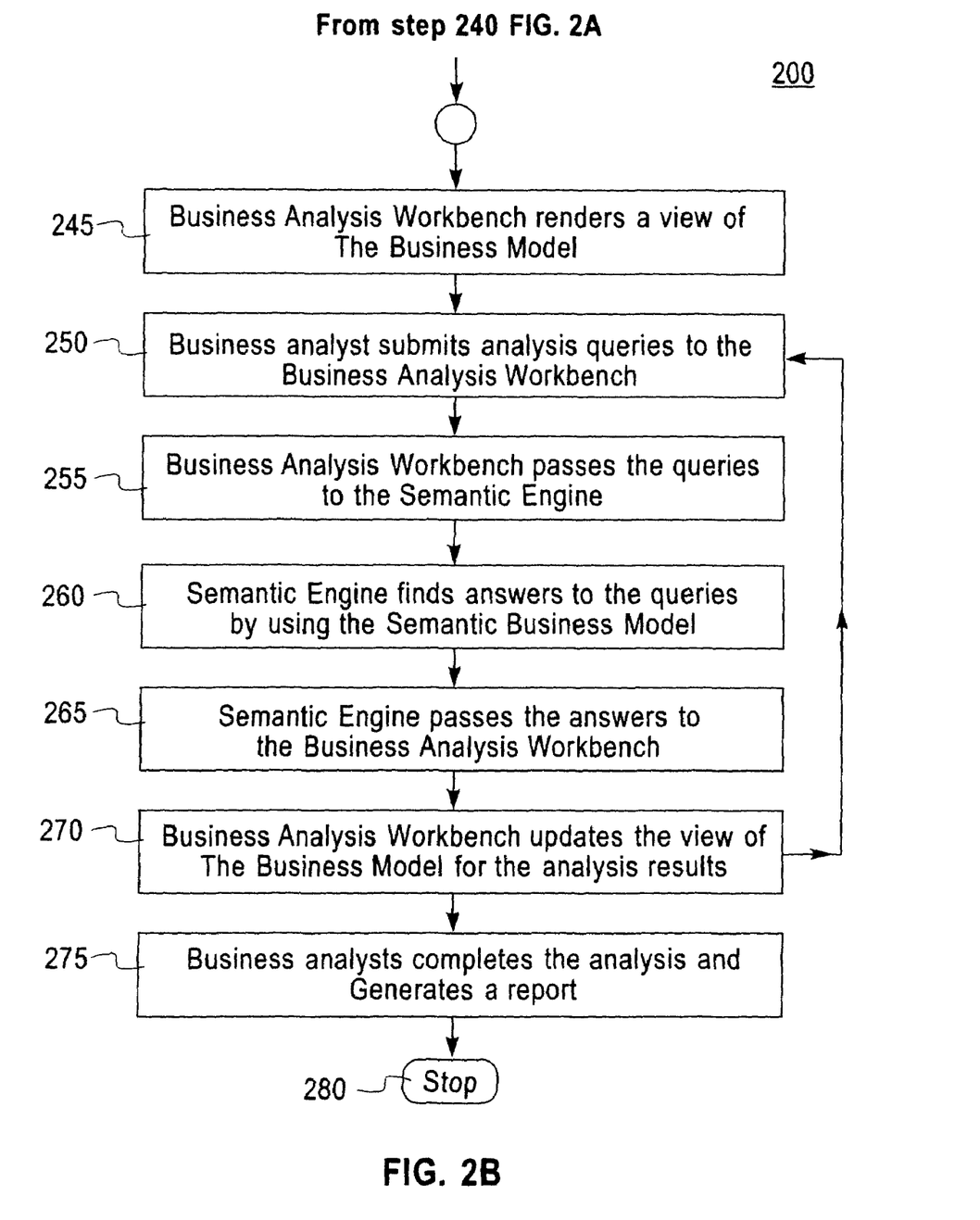

This two part process is shown in FIG. 2. The build-time process starts 205 with the generation 210 of a semantic business model 400 by the business model generator 120. The business model generator 120 receives business description input 110 and interprets the information by using the business meta-model 300 which formally describes structure and semantics of business information comprising one or more business entities including, but not limited to, business components, processes, activities, resources, services, metrics, and KPIs (Key Performance Indicators). As output, the business model generator 120 creates one or more semantic business model 400. Then the business model generator 120 stores 215 the generated semantic business model 400 in the business model repository 130. Then the business model repository 130 categorizes 220 the semantic business model 400, storing it with other semantic business models 400 in a persistent storage medium.

The run-time process starts at block 225 when one or more business analysts 140 open up the business analysis workbench 150 for an analysis of the business of one or more enterprises. Within the business analysis workbench 150, at block 230 the business analyst 140 opens one or more target business meta-model views 500 for analysis. For the rendering of the business model views 500 on the business analysis workbench 150, at block 235 the semantic engine 600 retrieves one or more semantic business models 400 form the business model repository 130. Then at block 240 the semantic engine 600 filters and processes the loaded semantic business models 400 for the visual rendering of the model 500 in the business analysis workbench 150. The semantic engine 600 sends out the processed business model to the workbench 150. Then at block 245 the business analysis workbench 150 renders the business model view 500, which is also known as the component business model (CBM) view 500.

Now, at block 250, the business analyst 140 is able to submit analysis queries to the CBM views 500 on the business analysis workbench 150. When the user submits a query 250 to the workbench 150, the query is passed 255 to the semantic engine 600. The semantic engine 600 with its inference/query processing capability finds 260 one or more answers to the query about the target semantic business model 500 rendered on the workbench 150. The answers are passed back 265 to the workbench 150 from the semantic engine 600. And the workbench 150 renders the query result on top of the target CBM view 500, thereby updating 270 the CBM view 500. This cycle from block 250 to block 270 is then repeated so long as the business analyst 140 continues to submit analysis queries to the CBM views 500 on the business analysis workbench 150.

When the business analyst 140 completes the analysis at block 275, the present invention provides a number of dependency analyses on semantic business models 400 including performance analysis, processed-based analysis, heat map analysis, shortfall assessment analysis, and enforcing consistency among universal business models, industry-specific business models, and enterprise-specific business models. The business analyst 140 can iteratively conduct one or more of these analyses on one or more of business models 500 using the system of the present invention. When the business analyst 140 completes his/her analysis on business models 500, the system generates 275 one or more reports on the analysis results.

Figure 3:
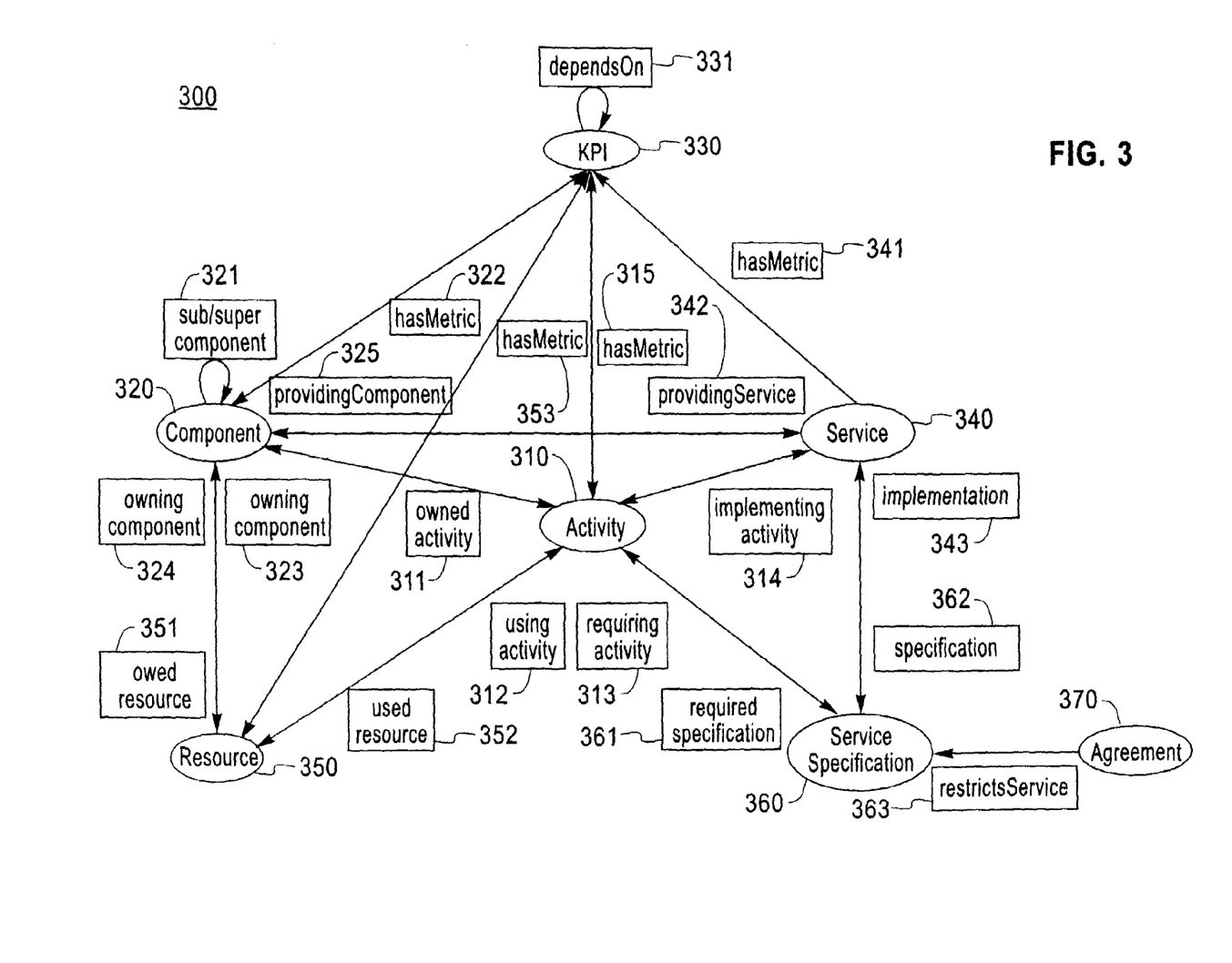
FIG. 3 is a diagram of a business meta-model supporting the invention.

FIG. 3 is a formal description of concepts (or classes) in a domain of discourse, i.e., business analysis, properties of each class describing its attributes, and relations with other classes. Furthermore, the meta-model shown in FIG. 3 can also describe logical properties of relations such as transitive, symmetric, and inverse, as well describing constraints on properties such as cardinality. The business meta-model 300 shows classes such as KPI 330, business components 320, business activities 310, business services 340, resource 350, service specification 360, and agreement 370, and the relations among them.

This meta-model 300 can be represented in one or more semantic markup languages such as OWL (Web Ontology Language) and RDF (Resource Description Framework) whose specification is provided by the WWW (World Wide Web) Consortium. The ontological representation of the meta-model allows rich expression of meaning of concepts and their relations in the domain, and query with automated reasoning.

The business activity class 310 has relationships with five classes in the meta-model 300. It has the owned activity relation 311 with the business component class 320, the using activity relation 312 with the resource class 350, the requiring activity relation 313 with the service specification class 360, and the hasMetric relation 315 with the KPI class 330.

The business component class 320 also has a number of relationships with other classes in the meta-model 300. It has the sub-component and super-component relations 321 to itself. It has the hasMetric 322 relation with the KPI class 330, the owning component relation 323 with the business activity class 310, also the owning component relation 324 with the resource class 350, and the providingComponent relation 325 with the service class 340.

The KPI (Key Performance Indicator) class 330 also has a number of relations with classes in the business meta-model 300. It has the dependentOn relations 331 to itself. It also has the hasMetric relation 322 with the business component class 320, the hasMetric relation 315 with the activity class 310, the hasMetric relation 353 with the resource class 350, and the hasMetric relation 341 with the service class 340.

The service class 340 also has a number of relations with classes defined in the business meta-model 300. It has the hasMetric relation 341 with the KPI class 330, the providingService relation 342 with the business component class 320, and the implementation relation 343 with the service specification class 360.

The resource class 350 has a number of relations with the classes defined in the business meta-model 300. It has the ownedResource relation 351 with the business component class 320, the usedResource relation 352 with the business activity class 310, and the hasMetric relation 353 with the KPI class 330.

The service specification class 360 has a number of relations with the classes defined in the business meta-model 300. It has the requiredSpecification relation 361 with the business activity class 310, the specification relation 362 with the service class 340, and the restrictService relation 363 with the agreement class 370. The restrictService relation 363 is the only relation which the agreement class 370 has.

Figure 4:
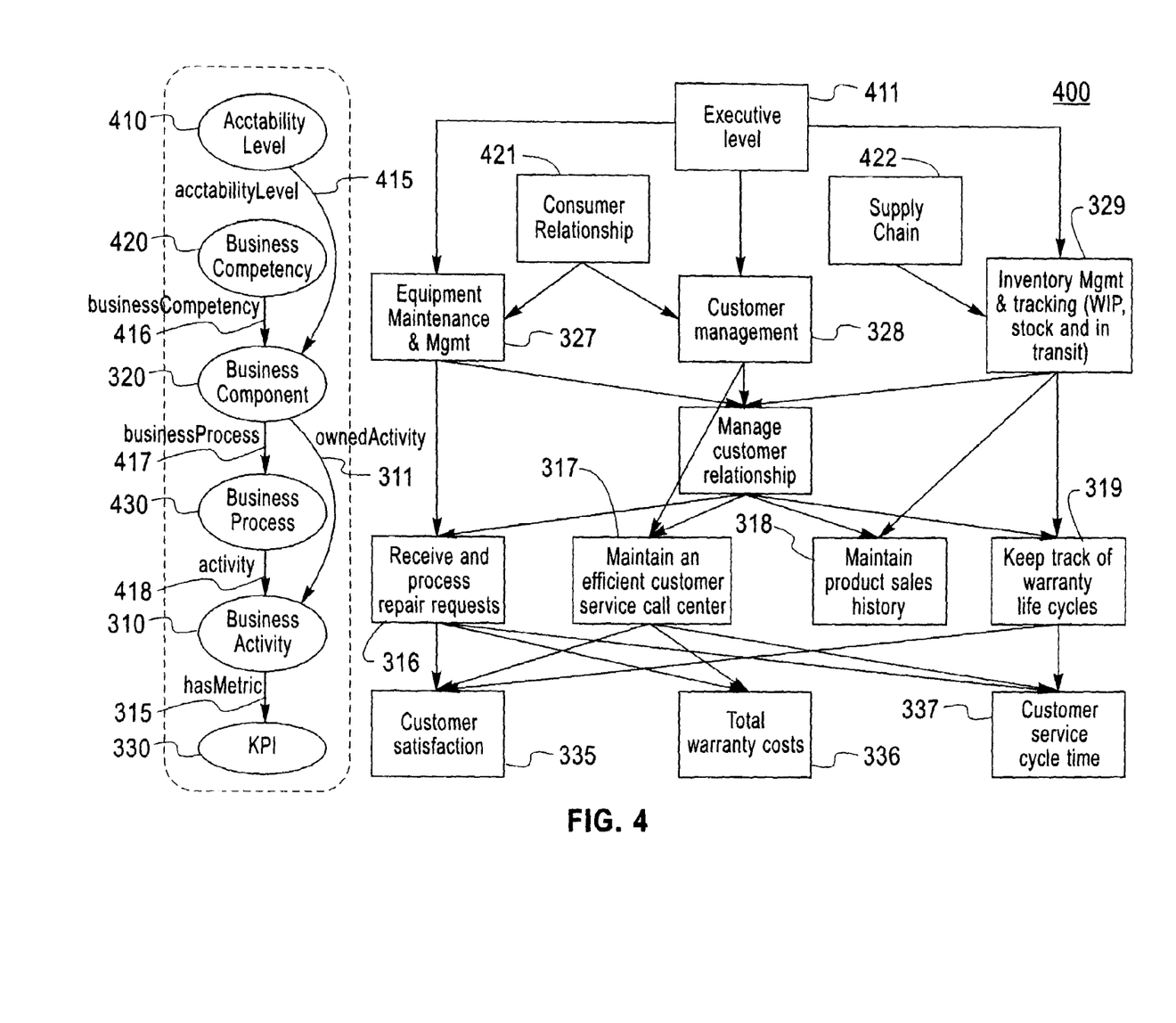
FIG. 4 is a diagram of a semantic business model supporting the invention.

A semantic business model 400 as shown in FIG. 4 is an instance of the business meta-model 300. The semantic business model 400 has a number of instances of the classes defined in the business meta-model 300. The relations among the instances are ones defined in the business meta-model 300, which are inherited by the semantic business model 400. This FIG. 4 shows a version 300' of the business meta-model 300 described in the previous FIG. 3. The meta-model 300' has a number of classes including Accountability Level 410, Business Competency 420, Business Component 320, Business Process 430, Business Activity 310, and KPI 330. The meta-model defines a number of relations among these classes, including the accountabilityLevel relation 415 between the Accountability Level class 410 and the Business Component class 320, the businessCompetency relation 416 between the Business Competency Class 420 and the Business Component 320, the businessprocess relation 417 between the Business Component class 320 and the Business Process class 430, the activity relation 418 between the Business Process class 430 and the Business Activity class 310, and, finally, the metric relation 419 between the Business Activity class 310 and the KPI class 330.

The classes in the business meta-model 300 or ontology can have one or more individual instances to represent actual business maps. FIG. 4 displays a semantic business model 400 showing some example instances of the classes in the meta-model 300. The model 400 shows one instance, Executive Level 411, of the Accountability Level class 410. It shows two instances, Customer Relationship 421 and Supply Chain 422, of the Business Competency class 420. It shows three instances of the Business Component class 320, that is, Equipment Maintenance and Management 327, Customer Management 328, and the Inventory Management and Tracking 329.

Note that the arrows from the instance 411 of the Accountability Level class 410 reach the instances (327, 328, 329) of the Business Component class 320. Those arrows represent the accountabilityLevel relation 415 among the instances as defined in the meta-model 300'. In a similar way, the arrows from the instances (421, 422) of the Business Competency class 420 also reach the instances of the Business Component class 320. Those arrows represent the businessCompetency relation 416 among the instances as defined in the meta-model 300'.

The semantic business model 400 shows one instance of the Business Process class 430, which is Manage Customer Relationship 431. There are arrows from instances (327, 328, 329) of the Business Component class 320 to Manage Customer Relationship 431, representing the businessProcess relationship 417 between Business Component class 320 and the Business Process class 430, as defined in the meta-model 300'. The model 400 also shows arrows connecting Manage Customer Relationship 431 to the four instances of the Business Activity class 310, that is, receive and Process Repair Requests 316, maintain an Efficient Customer Service Call Center 317, Maintain Product Sales History 318, and Keep Track of Warranty Life Cycles 319. These arrows represent the activity relationship 418 between business process 430 and business activity 310.

Also note that the instances 327, 328, and 329 of the Business Components 320 are connected by arrows to the instances 316, 317, 318, and 319 of the Business Activity class 310. These arrows represent the hasMetric relation 315 between business activity 310 and KPI 330, as defined in the meta-model 300'. The instance 431 of the Business Process class 430 has the activity relation to the instances 316, 317, 318, and 319 of the Business Activity class 310, as defined in the meta-model 300'. Finally, the instances 316, 317, 318, and 319 of the Business Activity class 310 have the metric relation 419 to the instances Customer Satisfaction 335, Total Warranty Costs 336, and Customer Service Cycle Time 337 of the KPI class 330, as defined in the meta-model 300'.

Business process 430 is a group of business activities 310 undertaken by an organization in pursuit of a common goal. Typical business processes 430 include receiving orders, marketing services, selling products, delivering services, distributing products, invoicing for services, and accounting for money received. A business process usually depends upon several business functions for support, e.g. IT, personnel, accounting. A business process rarely operates in isolation, i.e., other business processes will depend on it and it will depend on other processes.

Component Business Modeling (CBM) is a technique for modeling an enterprise as non-overlapping components 320 in order to identify opportunities for innovation and improvement. The modeling is of the business itself, not of applications or technology. CBM is an analytical tool; some call it a lens through which they can examine and analyze a business. CBM is complementary to process modeling techniques. A business process can be interpreted in CBM as collaboration among a network of business components. Conversely, from a process perspective, a business component is a closely related group of sub-processes.

Figure 5:
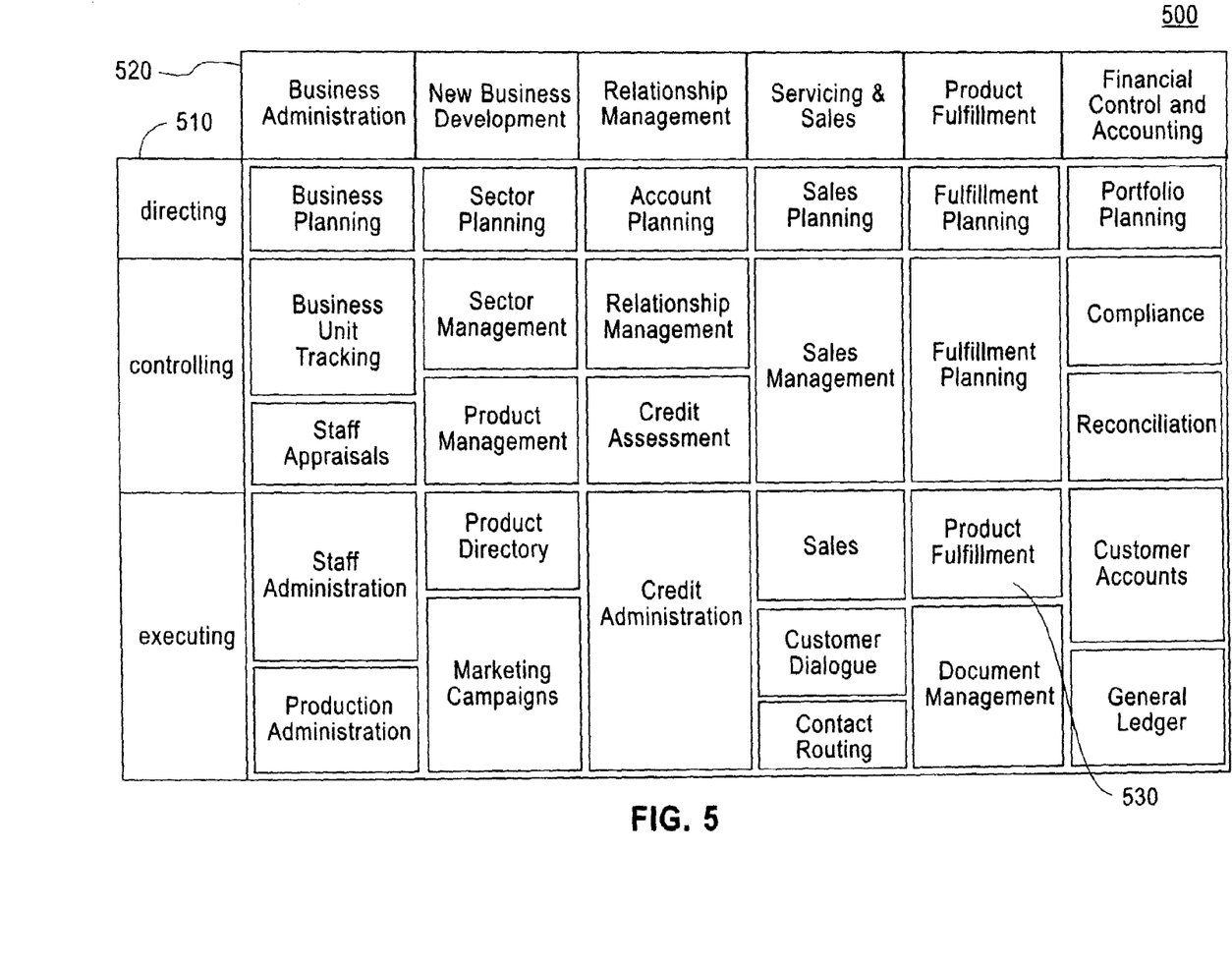
FIG. 5 is a diagram of a component business model view displayed on a business analysis workbench.

As shown in FIG. 5, CBM models a business as a set of business components (e.g. 530). A business component (item 320 in FIG. 3) is a part of an enterprise that has the potential to operate independently. In an extreme case a business component could operate as a separate company, or as part of another company. A business component 320 is a logical view of part of an enterprise that includes the resources, people, technology and know-how necessary to deliver some value.

A business offers goods or services in exchange for money or for other goods or services. So must a business component 320 if it is to operate independently. In turn, a business component 320 uses goods and services provided by other components and external suppliers. The single term business service 340 is used to mean some goods or service that a business component 320 offers to other business components and/or to external parties.

An enterprise can be viewed as a network of semi-independent business components 320 each of which uses business services which the others provide. Value to an external customer is provided by networks of cooperating business components 320.

The key characteristic of a business component 320 is that a user of its services doesn't have to be aware of how the component works. A user therefore doesn't need to know what people, processes and technology are being used, nor what other supplier services are contributing to the result. The user of a service only knows about the service itself, along with whatever associated properties are relevant, for example: the price, agreed service levels, terms and conditions. If a business component (e.g. 530) improves its technology, reengineers its internal processes or subcontracts some internal operations, its users need not know.

Business components are only potentially independent. They may be identified even when they are still entangled with the rest of the business and when the services they offer are not, or are only partly defined. A business component (e.g. 530) can also be characterized by associating it with a set of business activities 310. A business activity 310 is simply something the enterprise does, specified at a level that the enterprise considers to be appropriate.

A business component map 500 is a tabular view of the business components 320 (e.g. 530) in the scope of interest. The columns 520 of the table represent business competencies 420 and the rows 510 represent accountability levels 410. The business components 320 (e.g. 530) are rectangles within the table. Normally each component is within only one cell of the table, although a cell may have more than one component.

A business competency 520 is a large business area with characteristic skills and capabilities, for example, product development or supply chain. An accountability level 510 characterizes the scope and intent of activity and decision making. The three levels used in CBM are directing, controlling and executing.

Directing is about strategy, overall direction and policy, and may be associated with words like define policy, guidelines, assess performance, establish plans and targets, decide on strategy. Controlling is about monitoring, managing exceptions and tactical decision making, and may be associated with words like troubleshoot, define, maintain, rules and approach, qualify, categorize, track against plan, manage, manage exceptions, monitor. Executing is about doing the work, and is associated with words like operate, produce, maintain.

Activities 310 can also be mapped into this table. Indeed this is one of the ways of identifying components 320 (e.g. 530): take a set of activities 310 from a process model or from a set of executive interviews; choose a set of business competencies (e.g. 520) to form the columns of the table; allocate each activity into a row and column; group the activities 310 in each cell of business component map 500 into business components (e.g. 530).

Figure 6:
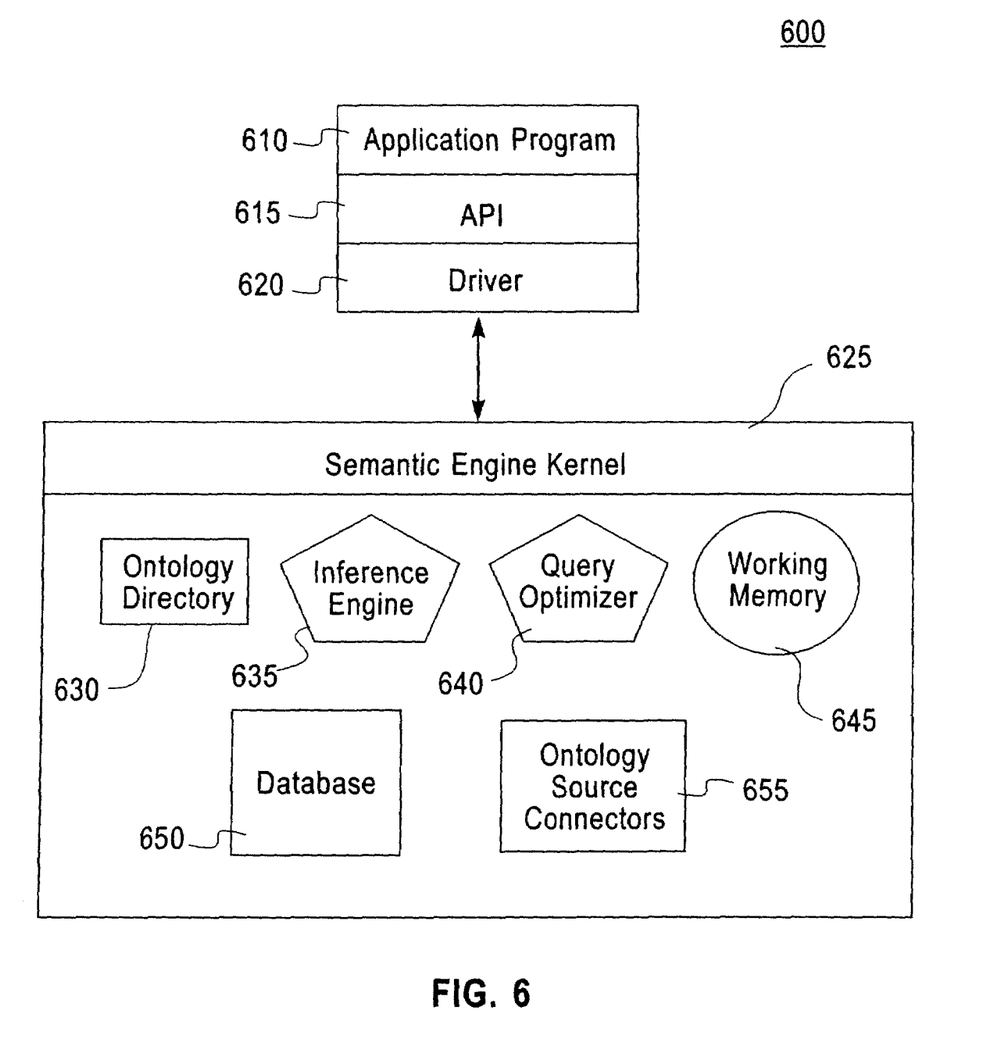
FIG. 6 is a conceptual diagram of a semantic engine.

As shown in FIG. 6, semantic engine 600 is a management system for ontologies that provides mechanisms for loading ontologies or semantic business models 400 from files and via the Internet and for locally creating and modifying ontologies. The semantic engine 600 provides an API 615 that provides a programming interface for interacting with ontologies (or semantic models 400). An ontology base for ontologies is equivalent to a database for data. A database allows an application to externalize the storing and processing of data, via a standard interface, and relieves the program 610 from the burden of deciding how to store the data in files, how to index the data, or how to optimized queries.

In the same way, an ontology base allows an application 610 to externalize the storing and processing of ontologies, via a standard interface 615 for driver 620, and to manipulate and query an ontology without worrying about how the ontology is stored and retrieved, how queries are processed, etc. A semantic model (or an ontology) is a description of things that exist, their properties and their relationships to each other. It is one way of encoding a model and has been adopted as one layer in the W3C's semantic Web. One use of an ontology is to externalize a model and make it easier to customize an application, without having to modify code. For example, by using SnoBase, programmers can write applications that understand ontologies written in standard semantic Web markup languages such as RDF, DAML+OIL and OWL. Applications can query against the created semantic models 400 and the inference engine deduces the answers and returns result sets similar to JDBC (Java Data Base Connector) result sets.

The semantic engine 600 provides an API 615. The API follows the design patterns of JDBC. Just like JDBC, the API 615 provides a connection-based interaction between applications and ontology sources. Also, the API 615 provides cursor-based result sets for representing query results. The API 615 allows connections to be made without reference to a particular base ontology. Such connections provide an access to default ontologies of the top-level definitions of XML-based ontology languages such as OWL, RDF, RDF Schema and XML Schema. These definitions are required in order to process the semantic business models 400.

Conceptually, the application programs 610 interact with the API 615 that provides high-level access to ontology resources and the semantic engine kernel 625. The application program 610 interacts with the API 615 that provides an access to an implementation of the API via an ontology base driver 620.

The driver 620 consists of software classes that will provide an implementation of the API 615, and contains of a number of components: a local ontology directory 630, an inference engine 635, a working memory 645, a query optimizer 640 and a set of connectors 655, and other infrastructure needed to support ontology management.

The Ontology Directory 630 provides the meta-level information about ontologies that are available to the driver 620. By default, the ontology directory 630 contains the references to the top-level definitions of OWL, RDF, RDF Schema, XML Schema, and similar definitions for the set of XML-based ontology languages supported. In addition, the ontology directory 630 provides metadata such as deployment information and additional sources of ontology information. For each ontology source, the directory 630 will need to store the Universal Resource Identifier or URI, which is an Internet protocol element consisting of a short string of characters that conform to a certain syntax. The string comprises a name or address that can be used to refer to a resource. For example, a "URL" is a URI scheme beginning with "http:". Additionally, a URI may store information about the contents of the ontology source to aid in query optimization.

The Inference Engine 635 provides a mechanism for interpreting the semantics of an ontology language, represented as a set of language specific rules. The rules are used to answer queries, when the requested fact is not immediately available, but must be inferred from available facts. For example, if the application requests the childrenOf an individual, but the working memory 645 only contains parentOf relations, the inference engine can use the inverse property statements about childrenOf and parentOf to identify the correct response.

For applications that connect to large databases and/or ontologies, it will not be feasible to load the entire set of available information into working memory 645. Instead, the driver 620 will query the ontology source for appropriate information as it is needed. In addition, the task of the query optimizer 640 is not only to optimize the retrieval of information from ontology sources, but also coordinate queries that span multiple sources.

The Ontology Source Connectors 655 provides a mechanism for reading, querying, and writing ontology information to persistent storage. The simplest connector is the file connector used to store information to the local file system. In addition, there will be connectors for storing ontological information in remote servers. Also, the connectors are used to implement caching of remote information to cache the definitions of the top-level ontology definitions OWL, RDF, RDF Schema, and XML Schema to allow the system to work if the W3C Web site were inaccessible.

The semantic engine 600 should also support query languages such as OWL Query Language (OWL-QL). OWL-QL is a language and protocol supporting agent-to-agent query-answering dialogues using knowledge represented in OWL. It precisely specifies the semantic relations among a query, a query answer, and the ontology base(s) used to produce the answer. It also supports query-answering dialogues in which the answering agent may use automated reasoning methods to derive answers to queries. An OWL-QL query contains a query pattern that is a collection of OWL sentences in which some literals and/or URIs have been replaced by variables. A query answer provides bindings of terms to some of these variables such that the conjunction of the answer sentences—produced by applying the bindings to the query pattern and considering the remaining variables in the query pattern to be existentially quantified—is entailed by a knowledge base (KB) called the answer KB. In addition to OWL-QL, the semantic engine 600 can also support another ontology query language such as RDQL, whose specification was submitted to W3C for a possible recommendation. RDQL is similar to OWL-QL in its underlying query mechanism.

Figure 7:
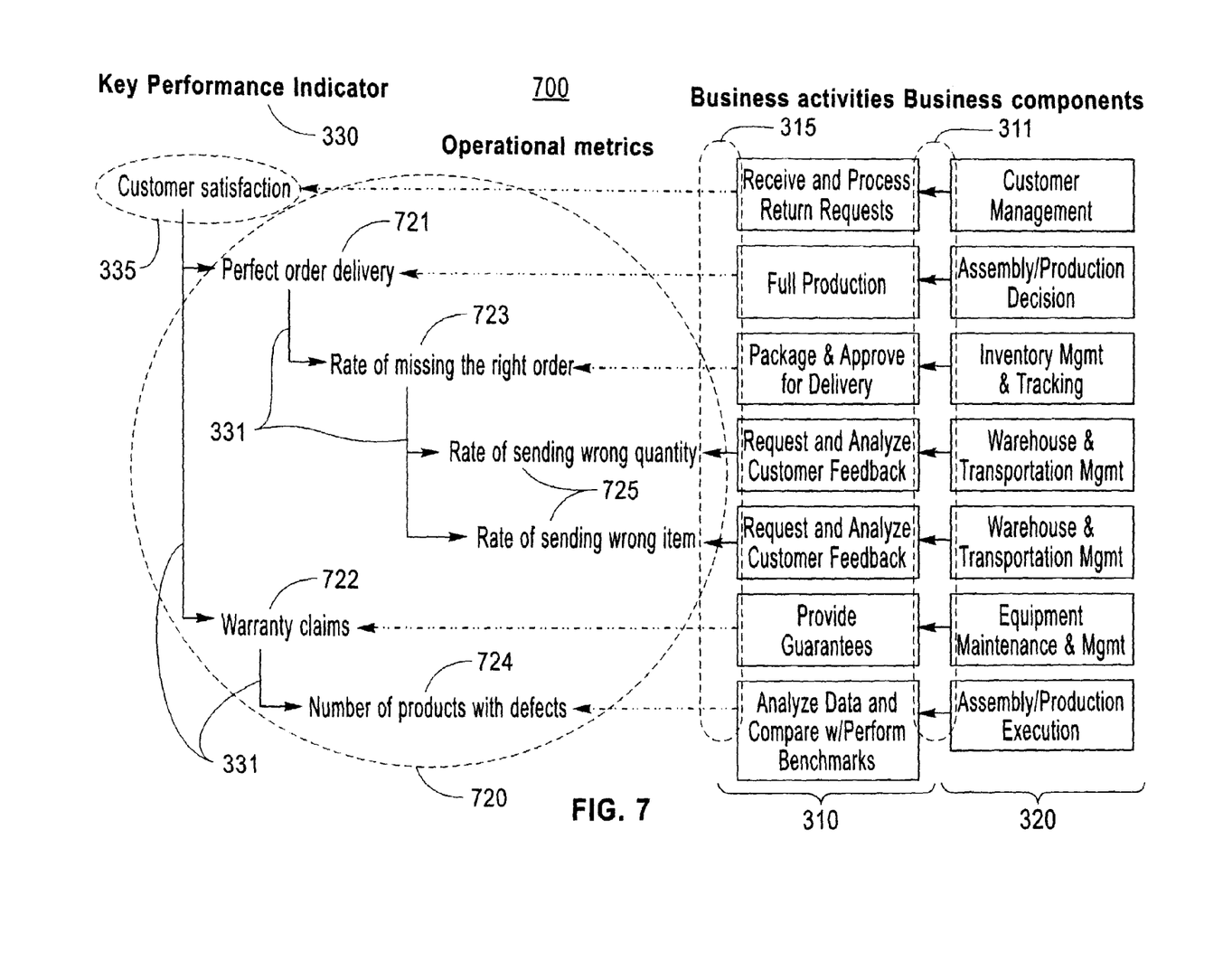
FIG. 7 is a conceptual diagram of a semantic business model for performance analysis.

FIG. 7 shows another version of the semantic business model 400. This semantic business model 700 shows three classes from the business meta-model 300, that is, the KPI class 330 (instantiated by customer satisfaction 335), the Business Activity class 310, and the Business Component class 320. The model 700 shows several instances of the classes and the relations among them. Particularly, note that this semantic model shows a business performance metrics tree which consist of a KPI of customer satisfaction 335 and a tree of operational metrics 720 which have impact on it. The tree has multiple levels; at the top, there is the KPI Customer Satisfaction Rate 335; at the second level, there are Perfect Order Delivery 721 and the Warranty Claims 722 which directly impact on the Customer Satisfaction Rate KPI; at the next level, there are operational metrics 723, 724 that directly have impact on the metrics at the second level; and there is another lower level of operational metrics 725. Note that there is a dependsOn relationship 331 between the various operational metric levels.

Each of these metrics is associated with one or more business activities 310, as shown by arrows the business activities 310 and the operational metrics 720, because the operational metrics 720 are used to measure the performance and efficiency of the business activities. These arrows represent the hasMetric relation 315 between business activities 310 and Key Performance Indicator 330.

Each of the Business Activities 310 is associated with a Business component 320, as a Business Component 320 is defined as a collection of Business Activities 310. This association is shown by an arrow between a Business Component 320 and a constituent Business Activity 310, the arrows representing the ownedActivity relationship 311 between the Business Component class 320 and the Business Activity class 310. Through the association of business activities 310 and operational metrics 720, business components 320 are indirectly associated with KPIs 330 and/or operational metrics 720. The associations among the KPIs, operational metrics, business activities, and business components are represented in a semantic business model 400 and 700 in one or more semantic markup languages such as RDF and OWL, and will be used in the inference of dependencies among business components 320 based on KPIs 330 and metrics 720.

The dependency information among business components 320 is useful in various contexts of business analysis, for example, to understand the impact of a certain business activity 310 of a business component 320 to one or more other business components 320, to understand the root cause of a certain phenomenon in a business component 320 affected by one or more other business components 320, to understand the flow of certain data or messages across multiple business components 320, and to understand the control flow of a certain business process across multiple business components 320.

Figure 8:
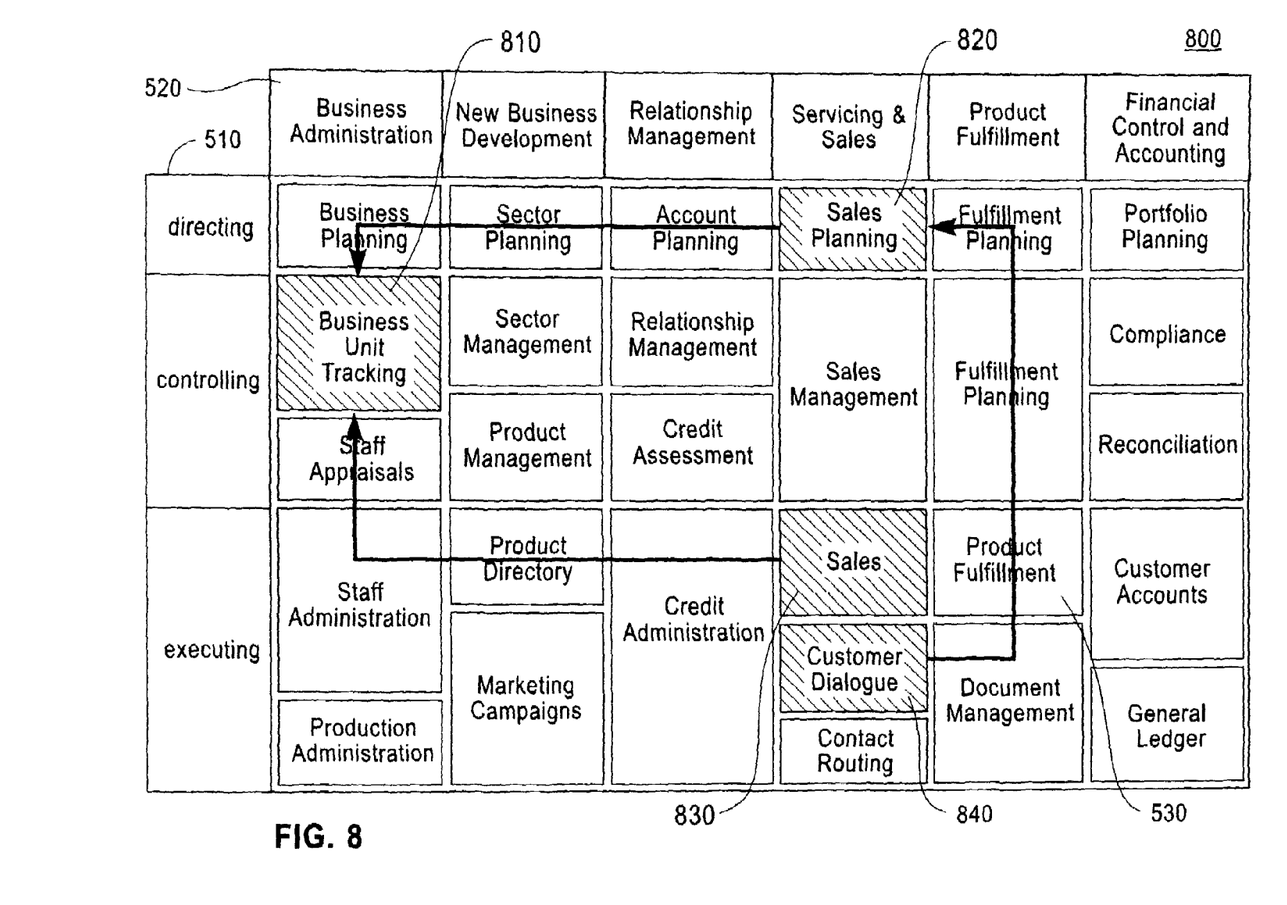
FIG. 8 is a diagram of a performance analysis result view on a business analysis workbench overlaid on a component business model view.

FIG. 8 illustrates use of the business analysis workbench 150. In order to better analyze the performance of the business, consultants need to determine which business components 320 are associated with and influence a given KPI 330 (such as customer satisfaction 335). The problem is that consultants associate KPIs 330 with business components 320, when it is more natural to associate KPIs 330 with business activities 310. Also, the entire process of identifying the association is currently done manually; thus it is difficult to perform a deep analysis of the relationship between business components 320. The present invention provides a solution to this problem by creating a semantic business model 400 and 700 that associates KPIs 330 with business activities 310, and business activities 310 with business components 320, capturing the relationship between KPIs 330 in the semantic business model 400 and 700, and providing a mechanism to automatically infer the dependencies among business components 320.

FIG. 8 shows the dependencies of business components 320 based on their association with KPIs 330 and operational metrics 720, in a component business model view 500 on the Business Analysis Workbench 150 by using an overlay 800 on the component business map of FIG. 5. The degree of the dependency may be indicated by different styles of texture painted in business component boxes in the component business map.

In the overlay, the Business Unit Tracking component 810 is directly dependent on two business components, that is, the Sales Planning component 820 and the Sales component 830. In addition, the Sales Planning component 820 depends on the Customer Dialogue component 840. Hence the Business Unit Tracking component 810 is indirectly dependent on the Customer Dialogue component 840. This indirect dependency is uncovered by the present invention, which represents in a semantic model the relationships among business related data such as business components, processes, activities, operational metrics, and KPIs (Key Performance Indicators) of an enterprise and queries the semantic model to discover non-obvious dependencies among the business entity data for business insights.

We will now review FIGS. 3, 4, 7 and 8 to illustrate use of the invention. FIG. 7 provides a use scenario or example showing how the invention works by using the business meta-model 300 and a semantic business model 400, and executing queries on them. Suppose the user is using an embodiment of this invention for a client engagement. Also suppose the client has a business pain point in their customer satisfaction rate 335. Let's say this client's rate is constantly lagging behind that of their competitors. The client wants to get help from their consultants, who are using an embodiment of this invention.

With the client, the first thing the user consultants would do is to construct the semantic business model 400 of this client by using the business meta-model 300 as the base structure. The user consultants first identify one or more operational metrics on which the customer satisfaction 335 depends. They can do this task by using several means, e.g., by using industry standard framework on metrics, performance indicators, and value drivers, and/or by interviewing the staff members and line of managers of the client company.

In this particular example in FIG. 7, the consultants discover that the customer satisfaction rate depends largely on two factors, i.e., perfect order delivery 721 and warranty claims 722, each of which in turn depends on lower-level metrics as shown in the figure, i.e., rate of missing the right order 723, rate of sending wrong quantity and rate of sending wrong item 725, number of products with defect. After identifying the dependency relationship among performance indicators and operational metrics, the consultants represent them in a formal model (i.e., in a formal semantic markup language such as RDF or OWL). In the formal model, the dependency relationship is represented by using "dependsOn" relationship 331 in FIG. 3. In an embodiment of the invention, they use the Business Model Generator 120 to create this formal representation of dependency relationships.

For the construction of a complete semantic business model 400, user consultants then discover business activities 310 that are associated with the identified performance indicators and operational metrics. Again, this task can be done by using knowledge of the industry standard framework and/or by interviewing domain expert from the client company. In FIG. 7, for an illustrative purpose, one business activity was identified for each performance indicator or operational metric. Now the relationships between metrics and business activities can also be added to the formal model, i.e., the semantic business model 400. A relationship defined in the Business Meta-model 300, i.e., "hasMetric" 315 can be used to represent those between metrics and business activities 310. Also, the Business Model Generator 120 will be used for actual editing of the Semantic Business Model 400.

Finally, the consultants can add the Business Components 320 that are associated with the Business Activities 310 to the Semantic Business Model 400. The association can be represented by using the "ownedActivity" relationship 311 defined in the Business Meta-model 310.

Once the Semantic Business Model 400 is constructed and represented in a formal semantic markup language, then it can be loaded up to the Semantic Engine 600 and used to answer queries from the business analysts 140. An example of such queries, in relation to the scenario described above (the client wants to pinpoint business components that affects the comparatively low performance of the company's customer satisfaction rate 335), would be "Find me all the Business Components 320 that are associated with a particular performance indicator (e.g., customer satisfaction rate 335)." Another example would be "Find the dependency relationship among the Business Components 320 associated with a performance indicator." The identified Business Components are referred to as "hot" components.

The Semantic Engine 600 can answer these queries by following the links represented in the formal model, the Semantic Business Model 400. It follows the "dependsOn" 331 links from the customer satisfaction rate 335, then (reversely) follows the "hasMetrics" 315 links from operational metrics to Business Activities 310, and finally (reversely) follows the "ownedActivity" 311 links from Business Activities 310 to Business Components 320. The final destination of following this sequence of links will be the "hot" Business Components. The following of these links in the formal model, the Semantic Business Model 400, is the basic idea of the inference capability provided by the Semantic Engine 600.

The identified "hot" business components in this example are shown in FIG. 8. They are Business Unit Tracking 810, Sales Planning 820, Sales 830, and Customer Dialogue 840. Their relationship are also inferred from the dependency represented by the "dependsOn" relationships among operational metrics. So they are the visual representation of the answers to the example queries given above. The visual display of the CBM view 500 with the answers are shown in the Business Analysis Workbench 150.

Again, this is a simple example illustrating the concept. You can do a lot more qualitative analysis by applying the ideas of this invention to different scenarios and larger scale examples.

In addition to the performance analysis presented in FIG. 8, the present invention enables other types of business analyses. We will describe a few concepts here. In order to better analyze the business performance, consultants need to determine how components depend on each other based on the control flow defined by processes. The problem is that the entire process is done manually; thus it is difficult to perform a deep analysis of the relationship between components. The present invention provides a solution to this problem by creating a semantic model that associates processes with activities, and activities with components, and providing a mechanism for automatically inferring the dependencies between components.

Business activities are associated with one or more business processes, because a business process is an ordered collection of business activities. Also, business activities are associated with one or more business components, as a business component is a collection of business activities, as defined earlier. Through the associations with business activities, business components are related to business processes. The relationship can be used in the dependency analysis of business components based on business processes.

With heat map analysis, business consultants intend to create multidimensional views (strategic, financial, and transformational view) of components (with color coding) to identify strategic components that indicate high potential for business improvement or carry high costs. The problem is that the current practice of creating heat maps requires manual labeling of values, resulting in inconsistent and incomplete maps, and lack of scalability. Also, the current heat maps provide a flat level analysis, and do not go deeper or broader. In addition, manual techniques limit heat maps to a small set of KPIs (e.g., cost, revenue). The present invention provides a solution to these problems by creating a semantic model of components and views, such that heat maps can be automatically generated by using simple semantic queries, deriving values for a component from the values of entities associated with the component, and so enable root-cause and impact analysis, and also extending the analysis to a larger set of KPIs.

The present invention also provides an improved methodology for overlaying IT systems or applications on a CBM map in order to make shortfall assessments. Systems are a kind of business assets. The overlay shows which components own which system. That is, current systems are mapped against the components to identify shortfalls in systems coverage. Three generic issues tend to arise in the shortfall assessment:

Gaps: no system exists, the system lacks key functionality, or is poorly designed/uses the wrong technology for a specific component Duplication: multiple systems compete for the same component, typically adding unnecessary complexity/cost to development, maintenance and production Over-Extension: a system designed to support one component is extended to help support others, for which it may not have appropriate capabilities. Furthermore, as a system gets more diverse or extensive the cost/complexity of its operation increases exponentially As the number of applications increase, visual examination would become tedious and inaccurate, if not impossible. For example: a large enterprise may use over a thousand applications simply in the accounting division. The present invention provides a solution to this problem. Given a semantic model, gaps, duplication, and over-extension of IT systems can be discovered by semantic queries, thereby extending the capabilities of visual examination. Note that semantic query will not replace visual CBM; it will complement visual examination.

The present invention may also be used in the creation of component business maps. Industry maps can be generated from the universal enterprise map. Also, maps for particular enterprises are created from industry maps. The problem with existing methods is that the process of creating CBM maps is manual. Also, modifications brought to a CBM are not propagated (up- and down-stream). Furthermore, consultants find it difficult to reuse the knowledge accumulated in previous engagements. The current practice of defining components with name and short description in maps allows ambiguity and inconsistency, and different interpretations.

This present invention provides a solution to these problems by capturing the relationships among the universal enterprise map, industry maps, and maps for particular enterprises, providing a controlled vocabulary for common understanding of terms, providing better, consistent definition of terms, providing automatic translation of terms, and propagating the modifications interactively.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer implemented method of analyzing dependencies of components in a component model of a business, comprising:
   generating a semantic business model by using a computer to apply a business meta-model to a component business model description of the business;
   presenting to a user by the computer a component business model of the business, and receiving by the computer from the user an analytical query of the component business model, said component business model being a representation of the business constructed by partitioning assets of the business into non-overlapping components that are mutually exclusive and collectively complete, each said non-overlapping component including respective mechanisms for doing something commercially useful with said respective assets;

executing by the computer the analytical query through the semantic business model to provide a response to the analytical query, said executing inferring dependencies among non-overlapping components of the component business model; and returning by the computer the response and said inferred dependencies to the user.

2. The method of claim 1, wherein the semantic business model is a meta-model of business components created by capturing semantics of business information and representing the semantics in a semantic markup language.

3. The method of claim 2, wherein the semantic markup language is drawn from the group consisting of Resource Description Framework (RDF) and Web Ontology Language (OWL).

4. The method of claim 1, wherein the semantic business model is generated by reusing an existing business semantic model, the reuse being accomplished using a computer pointing device operation.

5. The method of claim 4, wherein the computer pointing device operation makes available to the generated business model business information associated with one or more of business processes, business activities, resources, services, metrics, and KPIs.

6. The method of claim 1, wherein the semantic business model includes a universal enterprise layer, an industry layer, and a particular enterprise layer.

7. The method of claim 6, wherein updates to the component business model are propagated across said layers.

8. The method of claim 1, wherein one of said dependencies was inferred by using KPI associations represented in the semantic business model.

9. The method of claim 1, wherein one of said dependencies was inferred by using business process associations represented in the semantic business model.

10. The method of claim 1, wherein one of said dependencies was inferred based on messages sent and received among components as represented in the semantic business model.

11. A system for analyzing dependencies of components in a component model of a business, comprising:
   a computer implementing
   a business model generator for generating a semantic business model by applying a business meta-model to a component business model description of the business;
   a business analysis workbench for presenting to a user a component business model of the business, and receiving from the user an analytical query of the component business model, said component business model being a representation of the business constructed by partitioning assets of the business into non-overlapping components that are mutually exclusive and collectively complete, each said non-overlapping component including respective mechanisms for doing something commercially useful with said respective assets;
   a semantic engine for executing the analytical query through the semantic business model to provide a response to the analytical query, said executing inferring dependencies among non-overlapping components of the component business model; and
   means for returning the response and said inferred dependencies to the user via said workbench.

12. The system of claim 11, wherein the semantic business model is a meta-model of business components created by capturing semantics of business information and representing the semantics in a semantic markup language.

13. The system of claim 12, wherein the semantic markup language is drawn from the group consisting of Resource Description Framework (RDF) and Web Ontology Language (OWL).

14. The system of claim 11, wherein the semantic business model is generated by reusing an existing business semantic model, the reuse being accomplished using a computer pointing device operation.

15. The system of claim 14, wherein the computer pointing device operation makes available to the generated business model business information associated with one or more of business processes, business activities, resources, services, metrics, and KPIs.

16. The system of claim 11, wherein the semantic business model includes a universal enterprise layer, an industry layer, and a particular enterprise layer.

17. The system of claim 16, wherein updates to the component business model are propagated across said layers.

18. The system of claim 11, wherein one of said dependencies was inferred by using KPI associations represented in the semantic business model.

19. The system of claim 11, wherein one of said dependencies was inferred by using business process associations represented in the semantic business model.

20. The system of claim 11, wherein one of said dependencies was inferred based on messages sent and received among components as represented in the semantic business model.

21. A computer implemented system for analyzing dependencies of components in a component model of a business, comprising:
   a computer storing:
   first computer code for generating a semantic business model by applying a business meta-model to a component business model description of the business;
   second computer code for presenting to a user a component business model of the business, and receiving from the user an analytical query of the component business model, said component business model being a representation of the business constructed by partitioning assets of the business into non-overlapping components that are mutually exclusive and collectively complete, each said non-overlapping component including respective mechanisms for doing something commercially useful with said respective assets;
   third computer code for executing the analytical query through the semantic business model to provide a response to the analytical query, said executing inferring dependencies among non-overlapping components of the component business model; and
   fourth computer code for returning the response and said inferred dependencies to the user.

* * * * *